US012752606B2

(12) United States Patent
Shang et al.

(10) Patent No.: US 12,752,606 B2
(45) Date of Patent: Oct. 6, 2026

(54) VEHICLE WINDOW ASSEMBLY AND VEHICLE

(71) Applicant: FUYAO GLASS INDUSTRY GROUP CO., LTD., Fuqing (CN)

(72) Inventors: Guicai Shang, Fuqing (CN); Bingming Jiang, Fuqing (CN); Canzhong Zhang, Fuqing (CN); Lingchun Bu, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 279 days.

(21) Appl. No.: 18/654,532

(22) Filed: May 3, 2024

(65) Prior Publication Data

US 2024/0278625 A1 Aug. 22, 2024

Related U.S. Application Data

(63) Continuation of application No. PCT/CN2021/128767, filed on Nov. 4, 2021.

(51) Int. Cl.
*B60J 1/02* (2006.01)

(52) U.S. Cl.
CPC .......... *B60J 1/02* (2013.01); *B32B 2255/205* (2013.01); *B32B 2307/42* (2013.01)

(58) Field of Classification Search
CPC .............. B32B 17/10036; B32B 17/00; B32B 17/10458; B32B 17/10339; B32B 2307/42; B32B 2255/205; B60R 11/00; B60J 1/02
See application file for complete search history.

(56) References Cited

U.S. PATENT DOCUMENTS 5,077,133 A * 12/1991 Cheng ............... B32B 17/10761 501/905
2019/0025405 A1* 1/2019 Liu ....................... G01S 7/4026
(Continued)

FOREIGN PATENT DOCUMENTS

CN 206812771 U 12/2017
CN 207617482 U 7/2018
(Continued)

OTHER PUBLICATIONS

English translation of CN 111703151 combined with original document (Year: 2020).*
(Continued)

*Primary Examiner* — Ephrem Z Mebrahtu
(74) *Attorney, Agent, or Firm* — Scully, Scott, Murphy & Presser, P.C.

(57) ABSTRACT

A vehicle window assembly and a vehicle are provided. The vehicle window assembly includes a LiDAR and vehicle window glass. The vehicle window glass includes a first transparent plate, a thermoplastic interlayer, and a second transparent plate that are stacked. The LiDAR is disposed at one side of the second transparent plate away from the thermoplastic interlayer. The LiDAR is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate at an angle of incidence ranging from 55° to 70°. The vehicle window glass has a transmittance greater than or equal to 90% for the incident P-polarized light.

18 Claims, 6 Drawing Sheets

(56) References Cited

U.S. PATENT DOCUMENTS

| | | | | |
|---|---|---|---|---|
| 2020/0109081 | A1 * | 4/2020 | Lambricht | C03C 4/10 |
| 2021/0132273 | A1 | 5/2021 | Yamamoto et al. | |
| 2022/0324388 | A1 * | 10/2022 | Ouspenski | B60R 1/30 |
| 2022/0380248 | A1 * | 12/2022 | Li | B60R 11/00 |
| 2023/0271406 | A1 * | 8/2023 | Hagen | B32B 17/10036 428/336 |
| 2024/0034030 | A1 * | 2/2024 | Yavari | B32B 3/266 |

FOREIGN PATENT DOCUMENTS

| | | | |
|---|---|---|---|
| CN | 109130797 | A | 1/2019 |
| CN | 110228236 | A | 9/2019 |
| CN | 111409314 | A | 7/2020 |
| CN | 111703151 | A | 9/2020 |
| CN | 111761894 | A | 10/2020 |
| CN | 113238378 | A | 8/2021 |
| CN | 114619979 | A | 6/2022 |
| CN | 115157983 | A | 10/2022 |
| DE | 10159251 | C1 | 4/2003 |
| EP | 0537067 | A1 | 4/1993 |
| JP | S58128920 | A | 8/1983 |
| JP | 2000280738 | A | 10/2000 |
| JP | 2003252046 | A | 9/2003 |
| JP | 2004352006 | A | 12/2004 |
| JP | 2008516841 | A | 5/2008 |
| JP | 2010507517 | A | 3/2010 |
| JP | 2015051653 | A | 3/2015 |
| JP | 2019199399 | A | 11/2019 |
| JP | 2020059491 | A | 4/2020 |
| JP | 2020179842 | A | 11/2020 |
| KR | 20060058993 | A | 6/2006 |
| WO | 2006067622 | A1 | 6/2006 |
| WO | 2020017495 | A1 | 1/2020 |
| WO | 2021009347 | A1 | 1/2021 |
| WO | 2021136907 | A1 | 7/2021 |

OTHER PUBLICATIONS

English translation of CN 110228236 combined with original document (Year: 2020).*

First Office Action received in Chinese Patent Application No. 202180101949.9 dated Jan. 25, 2025.

Office Action received in Japanese Patent Application No. 2024-526715 dated May 30, 2025.

Extended European search report issued in corresponding European application No. 21934545.1, dated Dec. 4, 2024.

International Search Report dated Dec. 27, 2021 issued in PCT/CN2021/128767.

Notice of Reasons for Refusal issued in corresponding JP application No. 2024-526715 dated Oct. 8, 2025.

Request for the Submission of an Opinion in corresponding KR application No. 2024-7014761 dated Feb. 23, 2026.

Extended European search report issued in corresponding European application No. 23887848.2 dated Dec. 18, 2025.

Notice of reasons for refusal issued in corresponding JP application No. 2025-525387 dated Mar. 16, 2026.

The first office action issued in corresponding CN application No. 202211395268.0 dated Jan. 26, 2026.

* cited by examiner

VEHICLE WINDOW ASSEMBLY AND VEHICLE

CROSS-REFERENCE TO RELATED APPLICATION(S)

This application is a continuation of International Application No. PCT/CN2021/128767, filed Nov. 4, 2021, the entire disclosure of which is incorporated herein by reference.

TECHNICAL FIELD

This disclosure relates to the field of vehicle part technology, and in particular to a vehicle window assembly and a vehicle.

BACKGROUND

Vehicles have been one of the important transportation means for human beings, and autonomous driving technology is an important research direction in recent years. According to the standard classification of the taxonomy of driving automation for vehicles, the autonomous driving levels are classified into L0 (emergency assistance), L1 (partial driver assistance), L2 (combined driver assistance), L3 (conditionally autonomous driving), L4 (highly autonomous driving), and L5 (fully autonomous driving). At present, the mainstream consensus in the industry is that a vehicle above level of L2 must be equipped with a LiDAR.

SUMMARY

In a first aspect, a vehicle window assembly is provided in the present disclosure. The vehicle window assembly includes a LiDAR and vehicle window glass. The vehicle window glass includes a first transparent plate, a thermoplastic interlayer, and a second transparent plate that are stacked. The LiDAR is disposed at one side of the second transparent plate away from the thermoplastic interlayer. The LiDAR is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate at an angle of incidence ranging from 55° to 70°. The vehicle window glass has a transmittance greater than or equal to 90% for the incident P-polarized light.

In a second aspect, a vehicle is provided in the present disclosure. The vehicle includes a vehicle window assembly and a vehicle frame. The vehicle window assembly includes a LiDAR and vehicle window glass. The vehicle window glass includes a first transparent plate, a thermoplastic interlayer, and a second transparent plate that are stacked. The LiDAR is disposed at one side of the second transparent plate away from the thermoplastic interlayer. The LiDAR is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate at an angle of incidence ranging from 55° to 70°. The vehicle window glass has a transmittance greater than or equal to 90% for the incident P-polarized light. The vehicle window glass is mounted to the vehicle frame. The LiDAR is mounted to the vehicle window glass or the vehicle frame. The LiDAR is located in the vehicle.

BRIEF DESCRIPTION OF THE DRAWINGS

To describe the technical solutions in embodiments of the present disclosure more clearly, the accompanying drawings for use in the embodiments are briefly described. Apparently, the accompanying drawings in the following description show merely some embodiments of the present disclosure, and those of ordinary skill in the art may obtain other accompanying drawings from these accompanying drawings without creative effort.

Figure 1:
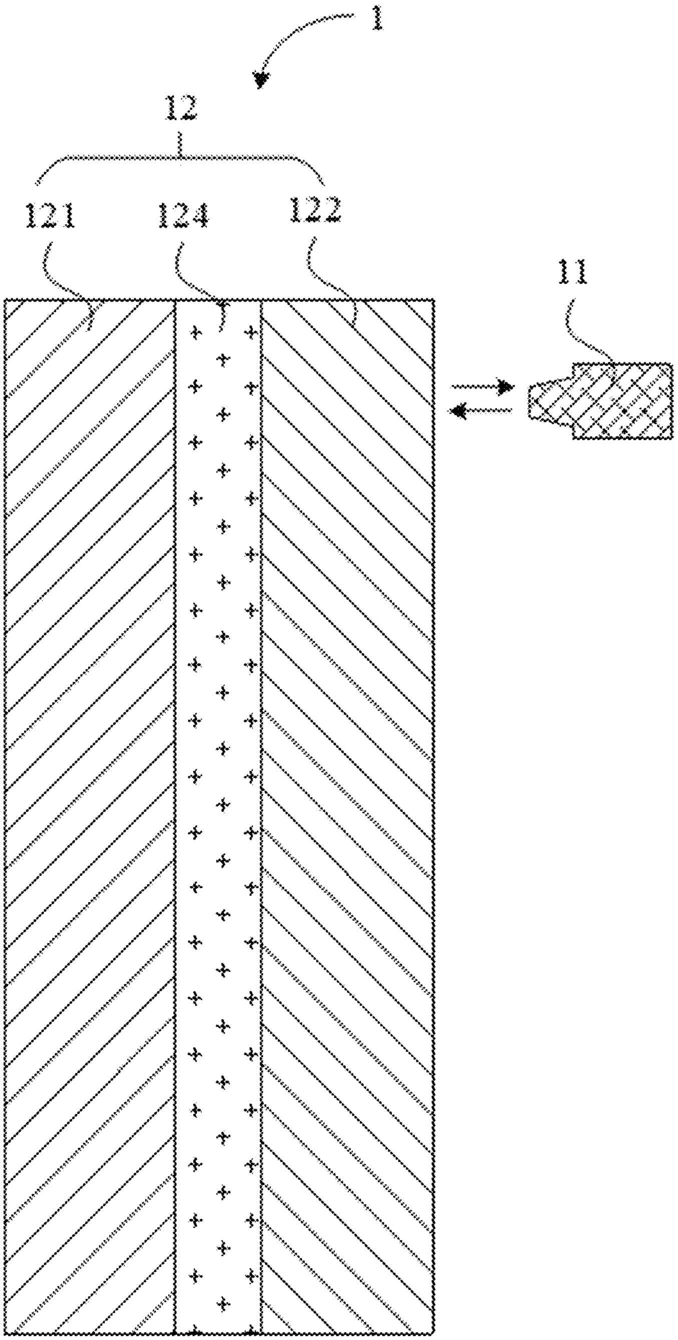
FIG. 1 is a schematic cross-sectional view of a vehicle window assembly provided in an implementation of the present disclosure.

Description of reference signs of the accompanying drawings: vehicle window assembly—1, LiDAR—11, vehicle window glass—12, first transparent plate—121, second transparent plate—122, masking layer—123, thermoplastic interlayer—124, thermal insulation layer—125, through hole—126, anti-reflective coating—127, vehicle—2, vehicle frame—21.

DETAILED DESCRIPTION

Technical solutions of embodiments of the present disclosure will be described clearly and completely below with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure.

A wavelength of laser light emitted by a LiDAR used on a vehicle ranges from 905 nm to 1550 nm. An advantage of the laser light lies in that focusing does not diverge over a long distance, but in this way, the laser light is unable to bypass obstacles, and the laser light may be greatly disturbed or even unable to operate in weather such as rain, fog, sandstorm, etc. Therefore, the trend and demand of the market is to fully integrate the LiDAR that is mounted outside the vehicle in the related art into the interior of the vehicle, especially on an inner surface of a windshield window. However, laser light emitted by a LiDAR mounted inside the vehicle and laser light received by the LiDAR mounted in the vehicle both need to be transmitted through vehicle window glass. A wavelength of 905 nm and a wavelength of 1550 nm both belong to a near infrared (NIR) band. An existing vehicle window glass has a relatively high blocking rate for NIR light to improve thermal comfort inside the vehicle. As a result, a transmittance for laser light having the wavelengths of 905 nm passing through the vehicle window glass and a transmittance for laser light having the wavelength of 1550 nm passing through the vehicle window glass both are low, which are insufficient to support practical application of the LiDAR.

The present disclosure discloses a vehicle window assembly, which can solve a technical problem of low transmittance of laser light emitted and received by a LiDAR passing through vehicle window glass.

In a first aspect, a vehicle window assembly is provided in the present disclosure. The vehicle window assembly includes a LiDAR and vehicle window glass. The vehicle window glass includes a first transparent plate, a thermoplastic interlayer, and a second transparent plate that are stacked. The LiDAR is disposed at one side of the second transparent plate away from the thermoplastic interlayer. The LiDAR is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate at an angle of incidence ranging from 55° to 70°. The vehicle window glass has a transmittance greater than or equal to 90% for the incident P-polarized light.

The LiDAR is disposed at the inner side of the vehicle window glass, and the vehicle window glass has the transmittance greater than or equal to 90% for the P-polarized light having the wavelength ranging from 800 nm to 1580 nm. Therefore, more P-polarized light emitted by the LiDAR is transmitted through the vehicle window glass, thereby avoiding affecting the practical application of the LiDAR.

Optionally, the first transparent plate and/or the second transparent plate has a first refractive index for natural light having a wavelength of 905 nm. The first transparent plate and/or the second transparent plate has a second refractive index for natural light having a wavelength of 1550 nm. The first refractive index is greater than the second refractive index.

Optionally, the first refractive index ranges from 1.450 to 1.485. The second refractive index ranges from 1.435 to 1.468.

Optionally, the laser light emitted by the LiDAR is pure P-polarized light.

Optionally, the laser light emitted by the LiDAR further includes S-polarized light. A proportion of the S-polarized light in the laser light emitted by the LiDAR is less than or equal to 20%.

Optionally, the first transparent plate and/or the second transparent plate has a first transmittance for natural light having a wavelength of 905 nm. The first transparent plate and/or the second transparent plate has a second transmittance for natural light having a wavelength of 1550 nm. The first transmittance is less than the second transmittance.

Optionally, the first transparent plate and/or the second transparent plate has an absorption coefficient of light ranging from 0.04 $cm^{-1}$ to 0.2 $cm^{-1}$.

Optionally, the first transparent plate and/or the second transparent plate has an absorption coefficient of light ranging from 0.05 $cm^{-1}$ to 0.18 $cm^{-1}$.

Optionally, the first transparent plate and/or the second transparent plate has an absorption coefficient of light ranging from 0.07 $cm^{-1}$ to 0.12 $cm^{-1}$.

Optionally, the first transparent plate is provided with an anti-reflective coating on a surface of the first transparent plate away from the thermoplastic interlayer, and/or the second transparent plate is provided with an anti-reflective coating on a surface of the second transparent plate away from the thermoplastic interlayer. The anti-reflective coating is configured to increase a transmittance of the vehicle window glass for the incident P-polarized light by at least 1.2%.

Optionally, the second transparent plate defines a through hole in a region of the second transparent plate corresponding to the LiDAR, and/or the thermoplastic interlayer defines a through hole in a region of the thermoplastic interlayer corresponding to the LiDAR.

Optionally, the first transparent plate is provided with an anti-reflective coating on a surface of the first transparent plate close to the thermoplastic interlayer. The anti-reflective coating is configured to increase a transmittance of the vehicle window glass for the incident P-polarized light by at least 1.2%.

Optionally, the anti-reflective coating has a thickness ranging from 200 nm to 1200 nm in a stacking direction.

Optionally, the first transparent plate is provided with an infrared reflective coating or an infrared absorbing coating on at least 70% of a surface of the first transparent plate close to the thermoplastic interlayer, or the second transparent plate is provided with an infrared reflective coating or an infrared absorbing coating on at least 70% of a surface of the second transparent plate close to the thermoplastic interlayer. The first transparent plate is not provided with the infrared reflective coating or the infrared absorbing coating in a region corresponding to the LiDAR on the surface of the first transparent plate close to the thermoplastic interlayer, or the second transparent plate is not provided with the infrared reflective coating or the infrared absorbing coating in the region corresponding to the LiDAR on the surface of the second transparent plate close to the thermoplastic interlayer.

Optionally, the vehicle window glass has a total solar energy transmittance less than or equal to 50%.

Optionally, in an operation wavelength range of the LiDAR, the first transparent plate and/or the second transparent plate has a higher transmittance for P-polarized light than natural light.

Optionally, the thermoplastic interlayer is sound insulation polyvinyl butyral (PVB).

Optionally, the vehicle window assembly further includes a thermal insulation layer. The thermal insulation layer further defines a through hole in a region of the thermal insulation layer corresponding to the LiDAR. The thermal insulation layer is selected from a single silver coating, a double silver coating, a three silver coating, or a silver alloy coating.

In a second aspect, a vehicle is provided in the present disclosure. The vehicle includes a vehicle window assembly and a vehicle frame. The vehicle window assembly includes a LiDAR and vehicle window glass. The vehicle window glass includes a first transparent plate, a thermoplastic interlayer, and a second transparent plate that are stacked. The LiDAR is disposed at one side of the second transparent plate away from the thermoplastic interlayer. The LiDAR is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate at an angle of incidence ranging from 55° to 70°. The vehicle window glass has a transmittance greater than or equal to 90% for the incident P-polarized light. The vehicle window glass is mounted to the vehicle frame. The LiDAR is mounted to the vehicle window glass or the vehicle frame. The LiDAR is located in the vehicle.

Optionally, the first transparent plate and/or the second transparent plate has a first refractive index for natural light having a wavelength of 905 nm. The first transparent plate and/or the second transparent plate has a second refractive index for natural light having a wavelength of 1550 nm. The first refractive index is greater than the second refractive index.

Optionally, the first transparent plate and/or the second transparent plate has a first transmittance for natural light having a wavelength of 905 nm. The first transparent plate and/or the second transparent plate has a second transmittance for natural light having a wavelength of 1550 nm. The first transmittance is less than the second transmittance.

A vehicle window assembly is provided in the present disclosure. Reference can be made to FIG. 1, which is a schematic cross-sectional view of a vehicle window assembly provided in an implementation of the present disclosure. The vehicle window assembly 1 includes a LiDAR 11 (also known as light detection and ranging) and vehicle window glass 12. The vehicle window glass 12 includes a first transparent plate 121, a thermoplastic interlayer 124, and a second transparent plate 122 that are stacked. The LiDAR 11 is disposed at one side of the second transparent plate 122 away from the thermoplastic interlayer 124. The LiDAR 11 is configured to emit laser light and receive laser light reflected by an object to-be-measured. The laser light emitted by the LiDAR includes P-polarized light. The P-polarized light has a wavelength ranging from 800 nm to 1580 nm. The P-polarized light is incident onto the second transparent plate 122 at an angle of incidence ranging from 55° to 70°. The vehicle window glass 12 has a transmittance greater than or equal to 90% for the incident P-polarized light.

In this implementation, the vehicle window glass 12 is a laminated glass. The first transparent plate 121 serves as an outer glass of the vehicle window glass 12. The second transparent plate 122 serves as an inner glass of the vehicle window glass 12. The LiDAR 11 is disposed at one side of the second transparent plate 122 away from the first transparent plate 121. In other words, the LiDAR 11 is disposed inside the vehicle and the LiDAR 11 can be protected.

It may be noted that by emitting laser light and receiving laser light reflected by an object to-be-measured, the LiDAR 11 calculates a distance between the object to-be-measured and the LiDAR 11 according to the time-of-flight (ToF) method or the frequency-modulated continuous wave (FMCW) method of laser light. Since the LiDAR 11 is disposed in the vehicle, the first transparent plate 121 and/or the second transparent plate 122 needs to have a relatively high transmittance for the laser light emitted by the LiDAR 11. In an operation wavelength range of the LiDAR 11, the first transparent plate 121 and/or the second transparent plate 122 has a higher transmittance for P-polarized light than natural light.

The P-polarized light is defined as follows. When a light ray passes through a surface of an optical element (such as a beamsplitter) at a non-perpendicular angle, both reflection and transmission characteristics depend on the polarization phenomena. In this case, the coordinate system used is defined by a plane containing an incident light beam and a reflected light beam. If a polarization vector of the light ray is on the plane, it is referred to as P-polarized light. If a polarization vector of the light ray is perpendicular to the plane, it is referred to as S-polarized light. Any incident polarization state can be expressed as a vector sum of a S component and a P component.

Specifically, the angle of incidence of the laser light emitted by the LiDAR 11 onto the first transparent plate 121 and/or the second transparent plate 122 ranges from 55° to 70°. In other words, when an installation angle of the vehicle window assembly 1 ranges from 20° to 35°, it is beneficial for the laser light emitted by the LiDAR 11 to be transmitted through the first transparent plate 121 and/or the second transparent plate 122, so as to reduce an influence of the Fresnel reflection.

It can be understood that in this implementation, the LiDAR 11 is disposed at the inner side of the vehicle window glass 12, and the first transparent plate 121 and/or the second transparent plate 122 has the transmittance greater than or equal to 90% for the P-polarized light having the wavelength ranging from 800 nm to 1580 nm. Therefore, more P-polarized light emitted by the LiDAR 11 is transmitted through the first transparent plate 121 and/or the second transparent plate 122, thereby avoiding affecting the practical application of the LiDAR 11.

It can be understood that the first transparent plate 121 and/or the second transparent plate 122 may also have the transmittance greater than or equal to 93% for the P-polarized light having the wavelength ranging from 800 nm to 1580 nm. Preferably, the first transparent plate 121 and/or the second transparent plate 122 may also have the transmittance greater than or equal to 95% for the P-polarized light having the wavelength ranging from 800 nm to 1580 nm, which is not limited in the present disclosure.

Figure 2:
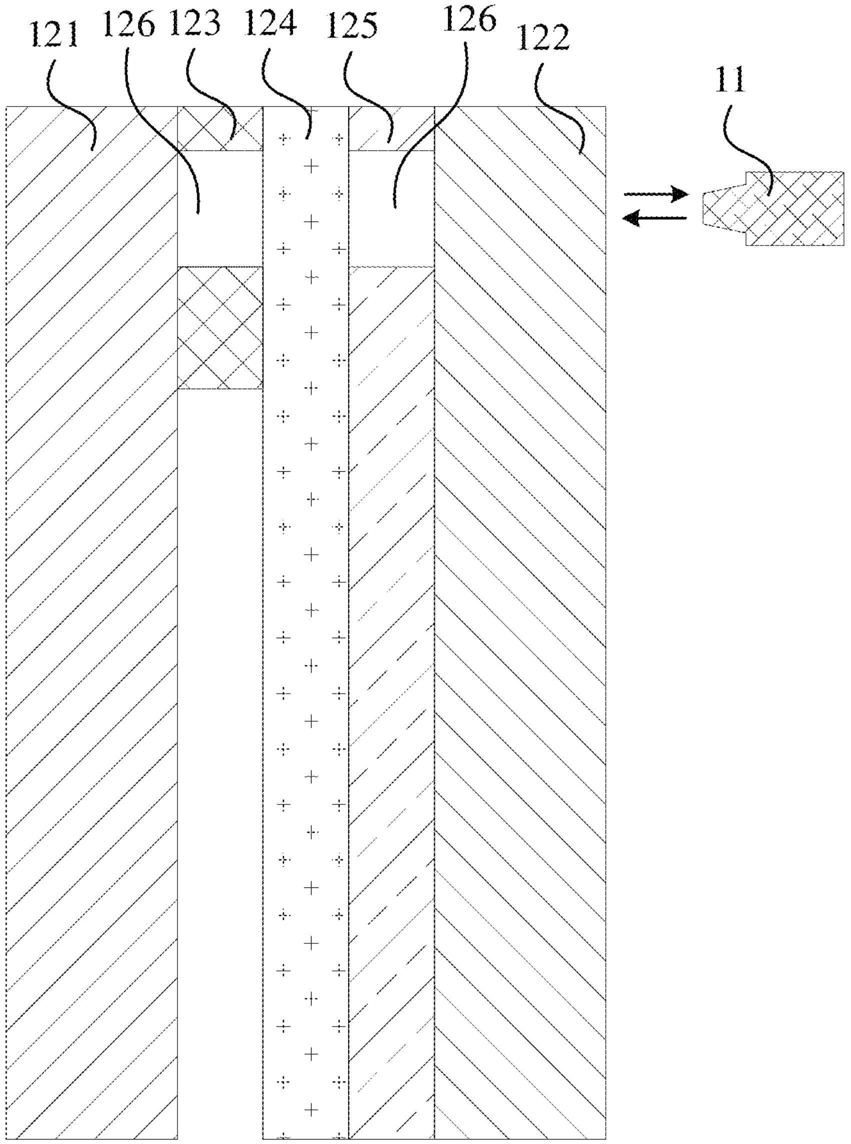
FIG. 2 is a schematic cross-sectional view of a vehicle window assembly provided in another implementation of the present disclosure.

In a possible implementation, reference can be made to FIG. 2 together, which is a schematic cross-sectional view of a vehicle window assembly provided in another implementation of the present disclosure. The vehicle window glass 12 further includes a masking layer 123 and a thermal insulation layer 125 that are stacked in sequence.

Specifically, the masking layer 123 is configured to shield a structure in the vehicle window glass 12, so as to avoid part of the structure in the vehicle window glass 12 from being directly observed outside the vehicle window glass 12, thereby improving the overall aesthetic degree. The masking layer 123 and the thermal insulation layer 125 further define through holes 126. The through holes 126 allow a signal emitted by the LiDAR 11 to pass through the masking layer 123 and the thermal insulation layer 125 through the through hole 126, or allow the LiDAR 11 to receive a signal transmitted from the outside of the vehicle window glass 12 through the through hole 126. It can be understood that in other possible implementations, the masking layer 123 may also be disposed at one side of the second transparent plate 122 away from the first transparent plate 121, which is not limited in the present disclosure.

In this implementation, the first transparent plate 121 and the second transparent plate 122 each employ a glass sheet having a thickness of 2.1 mm in a stacking direction. The thermoplastic interlayer 124 employs polyvinyl butyral (PVB) having a thickness of 0.76 mm. The first transparent plate 121, the thermoplastic interlayer 124, and the second transparent plate 122 are combined to form a laminated glass.

It can be understood that in other possible implementations, the choice of glass depends on the use. The first transparent plate 121 mainly needs to have durability and impact resistance that are against external obstacles, and therefore, the first transparent plate 121 is preferably a relatively thick glass. In order to meet the requirement of light weight, a total thickness of the first transparent plate 121 and the second transparent plate 122 is reduced, and the second transparent plate 122 may be a relatively thin glass. In order to meet the strength requirement of the vehicle window glass 12, the second transparent plate 122 may also be tempered to improve strength. The first transparent plate 121 and the second transparent plate 122 each may have any one of a planar shape and a curved shape, which is not limited in the present disclosure.

It can be understood that in other possible implementations, the thermoplastic interlayer 124 can be made of PVB, ethylene-vinyl acetate (EVA), polyurethane (PU), cyclic olefin polymer (COP), polyolefin elastomer (POE), and the like. Since the PVB has excellent adhesion with the glass plate, and excellent penetration resistance, and in consideration of sound insulation comfort, the thermoplastic interlayer 124 is preferably sound insulation PVB. The thermoplastic interlayer 124 may be formed by at least one thermoplastic layer, or may be formed by three thermoplastic layers, where a soft core layer is sandwiched by two outer layers that are harder than the soft core layer. The number of the layer of the thermoplastic interlayer 124 is not limited in the present disclosure, as long as the thermoplastic interlayer 124 is formed by a multi-layer structure including a core layer and at least one outer layer disposed at one side where the first transparent plate 121 is located. For example, the thermoplastic interlayer 124 may be formed by two thermoplastic layers including a core layer and an outer layer that is disposed at one side where the first transparent plate 121 is located. Alternatively, when taking a core layer as the intermediate layer, the thermoplastic interlayer 124 may include the core layer and two or more even-numbered outer layers that are disposed at each of two sides of the core layer, or the thermoplastic interlayer 124 may include the core layer, an odd-numbered outer layer that is disposed at one side of the core layer, and even-numbered outer layers that are disposed at the other side of the core layer.

In addition, on condition that only one outer layer is disposed, the outer layer is disposed close to the first transparent plate 121, so that the breakage resistance against external forces from the outside of the vehicle can be improved. Meanwhile, when the number of outer layers is relatively large, a sound insulation performance also becomes stronger. A material of the outer layer may be made of PVB. The core layer may be made of EVA, or PVB which is softer than PVB forming the outer layer. The soft core layer is sandwiched between the outer layers, so that the core layer can maintain the same adhesion and penetration resistance as a single-layer resin intermediate coating, and greatly improve the sound insulation performance.

The thermoplastic interlayer 124 may also have a wedge-shaped structure for use in head-up display. In this case, a portion where the thickness of the core layer and the outer layer of the thermoplastic interlayer 124 is minimized is the lowermost edge portion of the vehicle window glass 12, and the first transparent plate 121 and the second transparent plate 122 are not arranged in parallel. Such arrangement is also included in the vehicle window glass 12 in the present disclosure.

In this implementation, the thermal insulation layer 125 meets the requirements of heat insulation and sun protection, thereby improving comfort in the vehicle. The thermal insulation layer 125 may be an infrared reflective coating or an infrared absorbing coating, which is not limited in the present disclosure, as long as the arrangement of the thermal insulation layer 125 between the first transparent plate 121 and the second transparent plate 122 is not affected. In order to avoid the thermal insulation layer 125 from blocking the LiDAR 11 from emitting and/or receiving laser light, no thermal insulation layer 125 is disposed in a region of the vehicle window glass 12 corresponding to the LiDAR 11.

The infrared reflective coating includes at least one metal layer or a transparent conductive oxide (TCO) layer. A coating material of the metal layer may be selected from any material capable of reflecting infrared energy, such as (but not limited to) silver, gold, aluminum, copper, etc., preferably silver or a silver alloy, where the silver alloy is preferably an alloy of silver and at least one of gold, aluminum, or copper. The infrared reflective coating including the metal layer may be, such as a single silver coating, a double silver coating, a three silver coating, or a silver alloy coating. The TCO layer may be indium tin oxide (ITO), fluorine doped tin oxide (FTO), etc. The infrared reflective coating may further include a dielectric layer, a barrier layer, a protective layer, etc. The dielectric layer may include multiple coatings, such as $Si_3N_4$, $ZnSnO_x$, $ZnSnMgO_x$, or $ZnSnNiO_x$, or certainly may be selected from a group consisting of oxides of metals such as Zn, Sn, Mg, Ti, Ta, Nb, Bi, Zr, Si, Al, etc., and alloys thereof, or may be selected from a group consisting of nitrides, nitrogen oxides of metals such as Si, Al, Ti, Ta, Zr, Nb, etc., and alloys thereof. A material of the barrier layer may be selected from a group consisting of oxides, nitrides, nitrogen oxides, incomplete oxides, incomplete nitrides, and incomplete nitrogen oxides of metals such as Ti, Ni, Cr, Al, Zr, Zn, Nb, and Ta, and alloys thereof. A material of the protective layer may be $SiO_x$, $SiN_x$, $SiO_xN_y$, $SiAlO_x$, $SiAlO_xN_y$, $SiAlN_y$, $ZrO_x$, $ZrMO_x$, etc. The infrared absorbing coating can be formed by preparing inorganic infrared absorption components on a glass surface by a sol-gel method and curing. Specifically, an inorganic silicon alkoxide, an organic solvent, a silane coupling agent, a catalyst, and deionized water can be selected, and mixed and stirred to obtain a silica sol. Then, the silica sol, TCO nanoparticles, and an auxiliary agent are mixed and stirred, to obtain an infrared-absorbing thermal-insulation coating solution.

As mentioned above, the thermal insulation layer 125 has various types and can be formed by different processes. In this implementation, preferably, the thermal insulation layer 125 is selected from a single silver coating, a double silver coating, a three silver coating, or a silver alloy coating.

In a possible implementation, the first transparent plate 121 and/or the second transparent plate 122 has a first refractive index for natural light having a wavelength of 905 nm. The first transparent plate 121 and/or the second transparent plate 122 has a second refractive index for natural light having a wavelength of 1550 nm. The first refractive index is greater than the second refractive index.

It may be noted that at present, in the LiDAR technology used for autonomous vehicles, a near infrared (NIR) band which has two main wavelengths of 905 nm and 1550 nm is latest applicable. However, in the related art, the transmittance of the glass for signals in the NIR band is relatively low, and due to Fresnel reflection, some signals are lost each time the signals pass through the glass.

In this implementation, when an angle of incidence of laser light emitted by the LiDAR 11 incident onto the first transparent plate 121 and/or the second transparent plate 122 ranges from 55° to 70°, a light source of the LiDAR 11 is selected as P-polarized light or mainly P-polarized light. Therefore, a high transmittance of the first transparent plate 121 and/or the second transparent plate 122 for a signal in the NIR band can be realized, and in particular, the signal in the NIR band incident at the Brewster's angle can be completely transmitted through the first transparent plate 121 and/or the second transparent plate 122, with no reflection.

Specifically, the so-called Brewster's angle (also known as the polarization angle) is an angle of incidence at which light with a particular polarization is perfectly transmitted through a transparent media surface, with no reflection.

It can be understood that in this implementation, the first transparent plate 121 and/or the second transparent plate 122 has a relatively small refractive index for laser light in the NIR band. In other words, the laser light emitted by the LiDAR 11 is less refracted after passing through the first transparent plate 121 and/or the second transparent plate 122, which is beneficial to the measurement of the object to-be-measured by the LiDAR 11.

In a possible implementation, the first refractive index ranges from 1.450 to 1.485. The second refractive index ranges from 1.435 to 1.468.

It can be understood that in this implementation, the first refractive index and the second refractive index are both relatively small, so that the laser light emitted by the LiDAR 11 is less refracted after passing through the first transparent plate 121 and/or the second transparent plate 122, which is beneficial to the measurement of the object to-be-measured by the LiDAR 11.

In a possible implementation, the laser light emitted by the LiDAR 11 is pure P-polarized light.

Specifically, for P-polarized light and S-polarized light, reference can be made to the description above, which will not be repeated herein. When the P-polarized light is incident onto the second transparent plate 122 at the angle of incidence ranging from 55° to 70°, since in the operation wavelength range of the LiDAR 11, the first transparent plate 121 and/or the second transparent plate 122 has a higher transmittance for P-polarized light than natural light, the laser light emitted by the LiDAR 11 is selected as P-polarized light or mainly P-polarized light.

In a possible implementation, the laser light emitted by the LiDAR 11 further includes S-polarized light. A proportion of the S-polarized light in the laser light emitted by the LiDAR 11 is less than or equal to 20%.

It can be understood that when the laser emitted by the LiDAR 11 is the P-polarized light and the S-polarized light, a proportion of the S-polarized light in the laser light emitted by the LiDAR 11 may be less than or equal to 10%. Specifically, the proportion of the S-polarized light in the laser light emitted by the LiDAR 11 may also be less than or equal to 5%. Preferably, the proportion of the S-polarized light in the laser light emitted by the LiDAR 11 may also be less than or equal to 1%, which is not limited in the present disclosure.

In a possible implementation, the first transparent plate 121 and/or the second transparent plate 122 has a first transmittance to natural light having a wavelength of 905 nm. The first transparent plate 121 and/or the second transparent plate 122 has a second transmittance for natural light having a wavelength of 1550 nm. The first transmittance is less than the second transmittance.

It can be understood that in this implementation, the first transparent plate 121 and/or the second transparent plate 122 has a higher transmittance for the laser light in the NIR band, so that the laser light emitted by the LiDAR 11 is less reflected after passing through the first transparent plate 121 and/or the second transparent plate 122, which is beneficial to the measurement of the object to-be-measured by the LiDAR 11.

In a possible implementation, the first transparent plate 121 and/or the second transparent plate 122 has an absorption coefficient of light ranging from 0.04 $cm^{-1}$ to 0.2 $cm^{-1}$.

In this implementation, the absorption coefficient of light refers to the following. There is an internal transmittance when the natural light passes the path per cm in the first transparent plate 121 and/or the second transparent plate 122, then the absorption coefficient of light equals the negative value of the natural logarithm of the internal transmittance. After the laser light emitted by the LiDAR 11 is vertically incident onto the first transparent plate 121 and/or the second transparent plate 122, the light intensity is attenuated due to absorption of the first transparent plate 121 and/or the second transparent plate 122, so that the value of the absorption coefficient of light can be calculated by measuring the natural light transmittance of the first transparent plate 121 and/or the second transparent plate 122. Specifically, the value of the absorption coefficient of light can be calculated by using the following formula:

$$K = \frac{1}{l}\left\{2\ln\left[1 - \left(\frac{n-1}{n+1}\right)^2\right] + \ln\left[1 + \left(\frac{n-1}{n+1}\right)^4\right] - \ln T\right\},$$

where K is an absorption coefficient of light of the first transparent plate 121 and/or the second transparent plate 122, and l is a thickness of the first transparent plate 121 and/or the second transparent plate 122 in a stacking direction, n is a refractive index of the first transparent plate 121 and/or the second transparent plate 122 for laser light having a specific wavelength, T is a transmittance of the first transparent plate 121 and/or the second transparent plate 122 for the laser light having the specific wavelength.

Specifically, in other possible implementations, the first transparent plate 121 and/or the second transparent plate 122 may also have an absorption coefficient of light ranging from 0.05 $cm^{-1}$ to 0.18 $cm^{-1}$. Preferably, the first transparent plate 121 and/or the second transparent plate 122 may also have the absorption coefficient of light ranging from 0.07 $cm^{-1}$ to 0.12 $cm^{-1}$.

Figure 3:
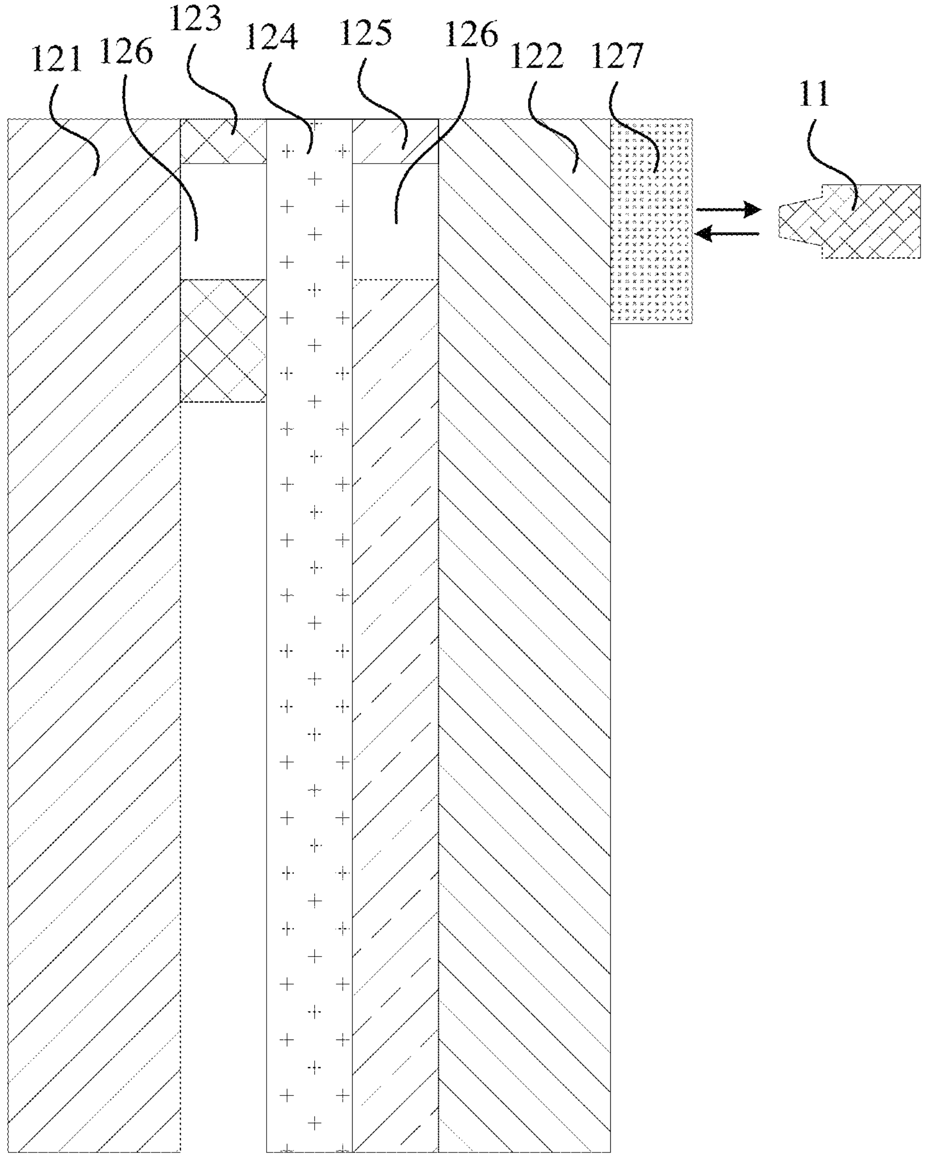
FIG. 3 is a schematic cross-sectional view of a vehicle window assembly provided in yet another implementation of the present disclosure.

In a possible implementation, reference can be made to FIG. 3 together, which is a schematic sectional view of a vehicle window assembly provided in yet another implementation of the present disclosure. The first transparent plate 121 is provided with an anti-reflective coating 127 on a surface of the first transparent plate 121 away from the thermoplastic interlayer 124, and/or on the second transparent plate 122 is provided with an anti-reflective coating 127 on a surface of the second transparent plate 122 away from the thermoplastic interlayer 124. The anti-reflective coating 127 is configured to increase a transmittance of the vehicle window glass 12 for the incident P-polarized light by at least 1.2%, more preferably by 1.5%.

Specifically, when the anti-reflective coating 127 is a two-layer coating, the anti-reflective coating 127 has a structure of a high-refractive-index layer/a low-refractive-index layer sequentially arranged from a surface of the vehicle window glass 12 to the outside. When the anti-reflective coating 127 is a three-layer coating, the anti-reflective coating 127 has a structure of a high-refractive-index layer/a middle-refractive-index layer/a low-refractive-index layer or a structure of a middle-refractive-index layer/a high-refractive-index layer/a low-refractive-index layer sequentially arranged from the surface of the vehicle window glass 12 to the outside. When the anti-reflective coating 127 is a four-layer coating, the anti-reflective coating 127 has a structure of a high-refractive-index layer/a low-refractive-index layer/a high-refractive-index layer/a low-refractive-index layer sequentially arranged from the surface of the vehicle window glass 12 to the outside. When the anti-reflective coating 127 is a multi-layer coating, the anti-reflective coating 127 has a structure of a high-refractive-index layer/a low-refractive-index layer alternately stacked from the surface of the vehicle window glass 12 to the outside, and the material of the outermost layer has the lowest refractive index.

A refractive-index difference between two adjacent layers of a high-refractive-index layer, a middle-refractive-index layer, and a low-refractive-index layer is preferably greater than or equal to 0.3. A material of the high-refractive-index layer is selected from a group consisting of AlN, $Si_3N_4$, Si, $TiO_2$, $ZrO_2$, $Fe_2O_3$, $TiN_x$, $Nb_2O_5$, $Ta_2O_5$, DLC, $MoO_x$, $CeO_2$, CuO, BiO, and $CrO_x$. A material of the middle-refractive-index layer is selected from a group consisting of $Al_2O_3$, AlN, $Si_3N_4$, $TiO_2$, MgO, $NdO_x$, $SbO_x$, ZnO, $ZrO_2$, $MoO_x$, and $CeO_2$. A material of the low-refractive-index layer is selected from a group consisting of $Al_2O_3$, $SiO_2$, SION, AlON, MgO, $MF_x$, and $WO_x$. It can be understood that the material of the anti-reflective coating 127 is not limited to the materials listed above.

In this implementation, the anti-reflective coating 127 is disposed corresponding to the through hole 126. It can be understood that in other possible implementations, the anti-reflective coating 127 may also cover the entire surface of the second transparent plate 122, which is not limited in the present disclosure.

It may be noted that the thermal insulation layer 125 in a region corresponding to the LiDAR needs to be removed. According to needs, the anti-reflective coating 127 in a region corresponding to the LiDAR may be remained while the anti-reflective coating 127 in a region not corresponding to the LiDAR may be removed. Specifically, the coating removal may be implemented by using technologies and processes such as masking or laser. It can be understood that due to the arrangement of the anti-reflective coating 127 and the through hole 126, the vehicle window glass 12 may further have a transmittance greater than or equal to 94% for P-polarized light having in the wavelength ranging from 800 nm to 1580 nm, which is not limited in the present disclosure.

Figure 4:
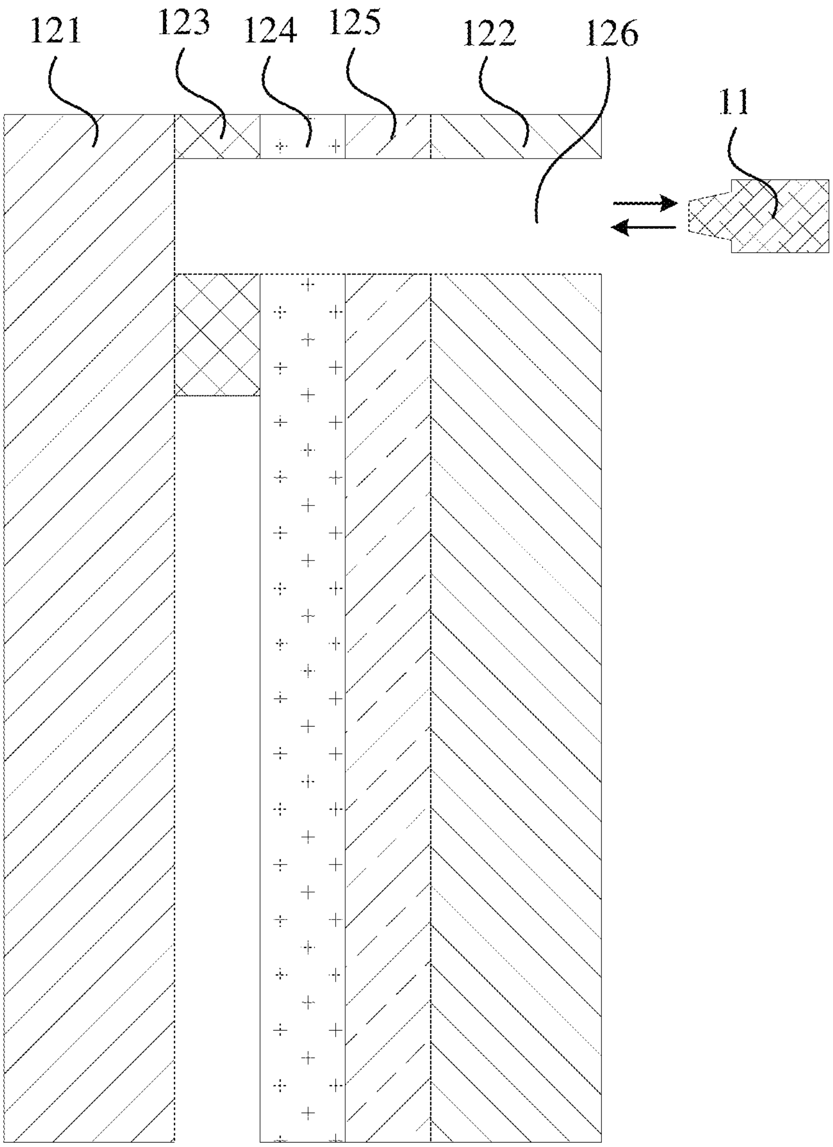
FIG. 4 is a schematic cross-sectional view of a vehicle window assembly provided in yet another implementation of the present disclosure.

In a possible implementation, reference can be made to FIG. 4 together, which is a schematic cross-sectional view of a vehicle window assembly provided in yet another implementation of the present disclosure. The second transparent plate 122 defines a through hole 126 in a region of the second transparent plate 122 corresponding to the LiDAR 11, and/or the thermoplastic interlayer 124 defines a through hole 126 in a region of the thermoplastic interlayer 124 corresponding to the LiDAR 11.

Specifically, the laser light emitted by the LiDAR 11 is incident onto the vehicle window glass 12 through the through hole 126. It can be understood that in this implementation, due to the arrangement of the through holes 126, the laser light emitted by the LiDAR 11 is further less reflected or absorbed by the vehicle window glass 12.

It may be noted that the first transparent plate 121 and the second transparent plate 122 both need to meet the above limitations to the refractive index and the absorption coefficient of light. However, when the through hole 126 is defined in the second transparent plate 122, only the first transparent plate 121 needs to follow the above limitation to the refractive index and the absorption coefficient of light.

It can be understood that due to the arrangement of the through hole 126, preferably, the vehicle window glass 12 may also have a transmittance greater than or equal to 95% for P-polarized light having the wavelength ranging from 800 nm to 1580 nm, which is not limited in the present disclosure.

Figure 5:
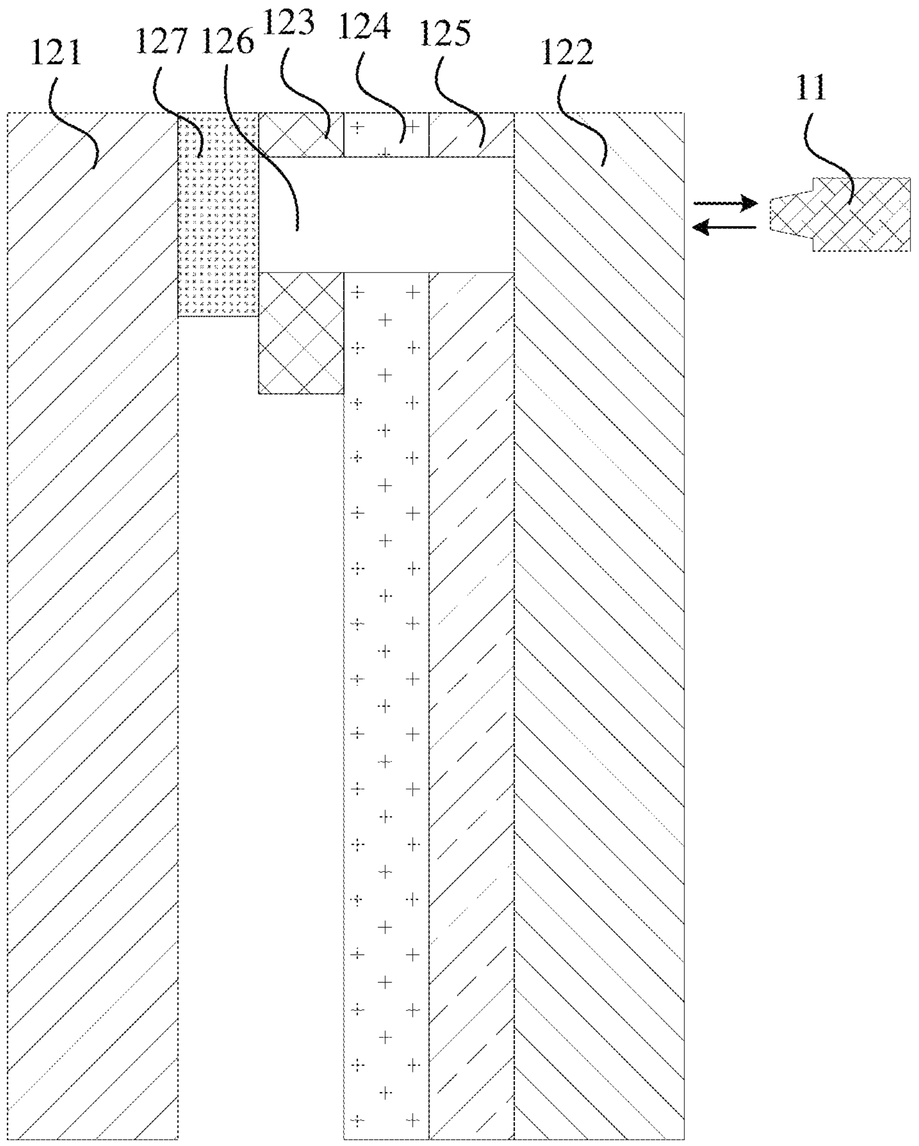
FIG. 5 is a schematic cross-sectional view of a vehicle window assembly provided in yet another implementation of the present disclosure.

In a possible implementation, reference can be made to FIG. 5 together, which is a schematic cross-sectional view of a vehicle window assembly provided in yet another implementation of the present disclosure. The first transparent plate 121 is provided with an anti-reflective coating 127 on a surface of the first transparent plate 121 close to the thermoplastic interlayer 124. The anti-reflective coating 127 is configured to increase a transmittance of the vehicle window glass 12 for the incident P-polarized light by at least 1.2%, and more preferably 1.5%.

It can be understood that the anti-reflective coating 127 may also be disposed at other positions of the vehicle window assembly 1. For example, the anti-reflective coating 127 may also be disposed on a surface of the first transparent plate 121 away from the thermoplastic interlayer 124, which is not limited in the present disclosure.

In a possible implementation, the anti-reflective coating 127 has a thickness ranging from 200 nm to 1200 nm in a stacking direction. It can be understood that in other possible implementations, the anti-reflective coating 127 may also have other thicknesses in the stacking direction, which is not limited in the present disclosure.

In a possible embodiment, the first transparent plate 121 is provided with an infrared reflective coating or an infrared absorbing coating on at least 70% of a surface of the first transparent plate 121 close to the thermoplastic interlayer 124, or the second transparent plate 122 is provided with an infrared reflective coating or an infrared absorbing coating on at least 70% of a surface of the second transparent plate 122 close to the thermoplastic interlayer 124. The first transparent plate 121 is not provided with the infrared reflective coating or the infrared absorbing coating in a region corresponding to the LiDAR 11 on the surface of the first transparent plate 121 close to the thermoplastic interlayer 124, or the second transparent plate 122 is not provided with the infrared reflective coating or the infrared absorbing coating in the region corresponding to the LiDAR 11 on the surface of the second transparent plate 122 close to the thermoplastic interlayer 124.

In a possible implementation, the vehicle window glass 12 has a total solar energy transmittance less than or equal to 50%. Therefore, heat transfer between the interior of the vehicle and the exterior of the vehicle can be reduced, thereby ensuring a thermal insulation effect of the vehicle window glass 12.

Next, the arrangement of the thermal insulation layer 125 and the anti-reflective coating 127 will be described in detail.

Specifically, the thermal insulation layer 125 is a functional silver layer. The functional silver layer may be deposited on a glass surface by magnetron sputtering. In other words, the functional silver layer may be plated on the second transparent plate 122 or the first transparent plate 121, as long as the coating faces the thermoplastic interlayer 124 and is connected to the thermoplastic interlayer 124.

According to the design requirements of the coating system of the thermal insulation layer 125, a horizontal type or upright type vacuum magnetron sputtering coating device is employed, and the substrate size meets the requirements of the vehicle window glass 12. Due to design requirements, the entire surface of the thermal insulation layer 125 does not need to be coated, the thermal insulation layer 125 corresponding to a window region of the LiDAR 11 needs to be removed, and the thermal insulation layer 125 at a periphery (i.e., a region corresponding to an opaque masking edge) of the entire vehicle window glass 12 also needs to be removed. The coating removal widths are different according to different customers. Specifically, there are following methods to implement the local coating. One straightforward method is to coat the entire surface of the glass, and then use laser light to de-coat a region that does not need to be coated. Another method is to use a mask during the coating, and the mask can prevent a sputtered material from reaching the glass substrate, so that the coating is only deposited on the desired regions.

A TCO coating may be formed on the glass surface by technologies such as magnetron sputter deposition or high temperature chemical vapor deposition to form the thermal insulation layer 125.

It may be noted that in this implementation, the anti-reflective coating 127 can realize a function of high transmittance in a NIR band of 800 nm-1580 nm. According to the design requirements of the coating system of the anti-reflective coating 127, a horizontal type or upright type vacuum magnetron sputtering coating device is employed, which may be continuous or discontinuous, may be in a reactive sputtering mode or a metallic sputtering mode, or may be a rotary drum coating device, and the substrate size meets the requirements of a vehicle windshield.

When the anti-reflective coating 127 only exists in a relatively small region, local coating is required. Specifically, there are following methods to implement the local coating. One straightforward method is to coat the entire surface of the glass, and then use laser light to de-coat the region that does not need to be coated. Another method is to use a mask during the coating, where the mask can prevent a sputtered material from reaching the glass substrate, so that the coating is only deposited one the desired region.

It may be noted that the method for disposing the thermal insulation layer 125 and the anti-reflective coating 127 provided in the present disclosure is described in detail in the foregoing contents, but the present disclosure is not limited to the specific implementations described above. Therefore, improvements, equivalent modifications and replacements, and the like made according to the technical requirements of the present disclosure all belong to the scope of protection of the present disclosure.

Next, different raw glasses are selected to test. The vehicle window glass 12 includes a first transparent plate 121 and a second transparent plate 122 that each having a thickness of 2.1 mm in the stacking direction, and a thermoplastic interlayer 124 that is made of PVB and has a thickness of 0.76 mm. Meanwhile, a combination of the first transparent plate 121, the second transparent plate 122, and the thermoplastic interlayer 124 may also be selected, to meet the requirements of light weight as much as possible for the vehicle window glass 12. Specific test results are shown in the following table.

TABLE 1

Table of test results of raw glass at angle of incidence of 0°

| | Embodiment 1 | Embodiment 2 | Embodiment 3 | Embodiment 4 | Embodiment 5 | Embodiment 6 |
|---|---|---|---|---|---|---|
| Raw $n_{(905\ nm)}$ | 1.483 | 1.456 | 1.464 | 1.461 | 1.472 | 1.473 |
| Raw $n_{(1550\ nm)}$ | 1.468 | 1.440 | 1.452 | 1.447 | 1.462 | 1.457 |
| Raw $K_{(905\ nm)}$ | 0.08 | 0.18 | 0.12 | 0.11 | 0.04 | 0.05 |
| Raw $K_{(1550\ nm)}$ | 0.07 | 0.17 | 0.08 | 0.09 | 0.05 | 0.05 |
| Raw $T_{NIR(905\ nm)}$ | 91.17% | 92.17% | 90.88% | 89.90% | 91.82% | 91.97% |
| Raw $T_{NIR(1550\ nm)}$ | 91.66% | 92.61% | 91.85% | 90.94% | 92.14% | 92.17% |

In Table 1, the raw $n_{(905\ nm)}$ is a first refractive index of raw glass selected as the first transparent plate 121 and/or the second transparent plate 122 for natural light having a wavelength of 905 nm. The raw $n_{(1550\ nm)}$ is a second refractive index of raw glass selected as the first transparent plate 121 and/or the second transparent plate 122 for natural light having a wavelength of 1550 nm. The raw $K_{(905\ nm)}$ is an absorption coefficient of light of raw glass selected as the first transparent plate 121 and/or the second transparent plate 122 for natural light having the wavelength of 905 nm. The raw $K_{(1550\ nm)}$ is an absorption coefficient of light of raw glass selected as the first transparent plate 121 and/or the second transparent plate 122 for natural light having a wavelength of 1550 nm. The raw $T_{NIR(905\ nm)}$ is a first transmittance of raw glass selected as the first transparent plate 121 and/or the second transparent plate 122 for natural light having the wavelength of 905 nm. The raw $T_{NIR(1550\ nm)}$ is a second transmittance of raw glass selected as the first transparent plate 121 and/or the second transparent plate 122 for natural light having the wavelength of 1550 nm. The natural light is light that does not directly show a polarization phenomenon. The measurement is carried out using ordinary light sources, such as a D65 standard light source adopted by ISO 9050, and an A light source adopted by ISO 13837.

TABLE 2

Table of test results at angle of incidence of 60°

| | Embodiment 1 | Embodiment 2 | Embodiment 3 | Embodiment 4 | Embodiment 5 | Embodiment 6 |
|---|---|---|---|---|---|---|
| Raw-P-$T_{(800\ nm-1580\ nm)}$ | 97.88% | 98.19% | 96.08% | 95.62% | 95.44% | 95.13% |
| Laminated-P-$T_{(800\ nm-1580\ nm)}$ | 92.02% | 92.89% | 91.62% | 91.98% | 91.03% | 91.27% |

TABLE 2-continued

Table of test results at angle of incidence of 60°

| | Embodiment 1 | Embodiment 2 | Embodiment 3 | Embodiment 4 | Embodiment 5 | Embodiment 6 |
|---|---|---|---|---|---|---|
| Laminated + anti-reflective (AR)-P-$T_{(800\ nm\text{-}1580\ nm)}$ | 93.83% | 94.41% | 93.53% | 93.45% | 92.97% | 92.77% |

The raw-P-$T_{(800\ nm\text{-}1580\ nm)}$ is a transmittance of raw glass selected as the first transparent plate 121 and/or the second transparent plate 122 for P-polarized light having a wavelength ranging from 800 nm to 1580 nm incident at an angle of incidence of 60°. The laminated-P-$T_{(800\ nm\text{-}1580\ nm)}$ is a transmittance of the first transparent plate 121, the thermoplastic interlayer 124, and the second transparent plate 122, that are stacked, for P-polarized light having the wavelength ranging from 800 nm to 1580 nm incident at the angle of incidence of 60°. The laminated+AR-P-$T_{(800\ nm\text{-}1580\ nm)}$ is a transmittance of the first transparent plate 121, the thermoplastic interlayer 124, the second transparent plate 122, and the anti-reflective coating 127, that are stacked, for P-polarized light having the wavelength ranging from 800 nm to 1580 nm incident at the angle of incidence of 60°.

TABLE 3

Table of test results at angle of incidence of 66°

| | Embodiment 1 | Embodiment 2 | Embodiment 3 | Embodiment 4 | Embodiment 5 | Embodiment 6 |
|---|---|---|---|---|---|---|
| Raw-P-$T_{(800\ nm\text{-}1580\ nm)}$ | 94.68% | 95.79% | 93.08% | 93.62% | 94.44% | 94.57% |
| Laminated-P-$T_{(800\ nm\text{-}1580\ nm)}$ | 91.08% | 91.86% | 90.78% | 90.77% | 90.77% | 91.05% |
| Laminated + AR-P-$T_{(800\ nm\text{-}1580\ nm)}$ | 92.83% | 93.36% | 92.59% | 92.11% | 92.65% | 92.44% |

The raw-P-$T_{(800\ nm\text{-}1580\ nm)}$ is a transmittance of raw glass selected as the first transparent plate 121 and/or the second transparent plate 122 for P-polarized light having a wavelength ranging from 800 nm to 1580 nm incident at an angle of incidence of 66°. The laminated-P-$T_{(800\ nm\text{-}1580\ nm)}$ is a transmittance of the first transparent plate 121, the thermoplastic interlayer 124, and the second transparent plate 122, that are stacked, for P-polarized light having the wavelength ranging from 800 nm to 1580 nm incident at the angle of incidence of 66°. The laminated+AR-P-$T_{(800\ nm\text{-}1580\ nm)}$ is a transmittance of the first transparent plate 121, the thermoplastic interlayer 124, the second transparent plate 122, and the anti-reflective coating 127, that are stacked, for P-polarized light having the wavelength ranging from 800 nm to 1580 nm incident at the angle of incidence of 66°.

It can be understood that the above test results show that when the angle of incidence ranges from 55° to 70°, raw glass, which is in a limited range of refractive index, a limited transmittance, and a limited range of absorption coefficient of light, has a transmittance of at least 93% for P-polarized light having the wavelength ranging from 800 nm to 1580 nm. When the angle of incidence ranges from 55° to 70°, and the laminated glass made of the raw glass serves as the vehicle window glass 12 without the anti-reflective coating 127, the vehicle window glass 12 has a transmittance of at least 90% for P-polarized light having the wavelength ranging from 800 nm to 1580 nm. Therefore, the requirement for high transmittance of the LiDAR located in the vehicle can be met, normal operation of the LiDAR can be ensured, and accuracy can be improved. It can be seen from Table 2 and Table 3 that after the anti-reflective coating 127 is disposed on the vehicle window glass 12, the vehicle window glass 12 has a transmittance of at least 92% for P-polarized light having the wavelength ranging from 800 nm to 1580 nm. For the P-polarized light having the wavelength ranging from 800 nm to 1580 nm, the transmittance of the vehicle window glass provided with the anti-reflective coating 127 can be increased by at least 1.2% or even at least 1.5%, compared to the transmittance of the vehicle window glass provided with no anti-reflective coating 127. Therefore, the anti-reflective coating 127 has an obvious anti-reflective effect.

Figure 6:
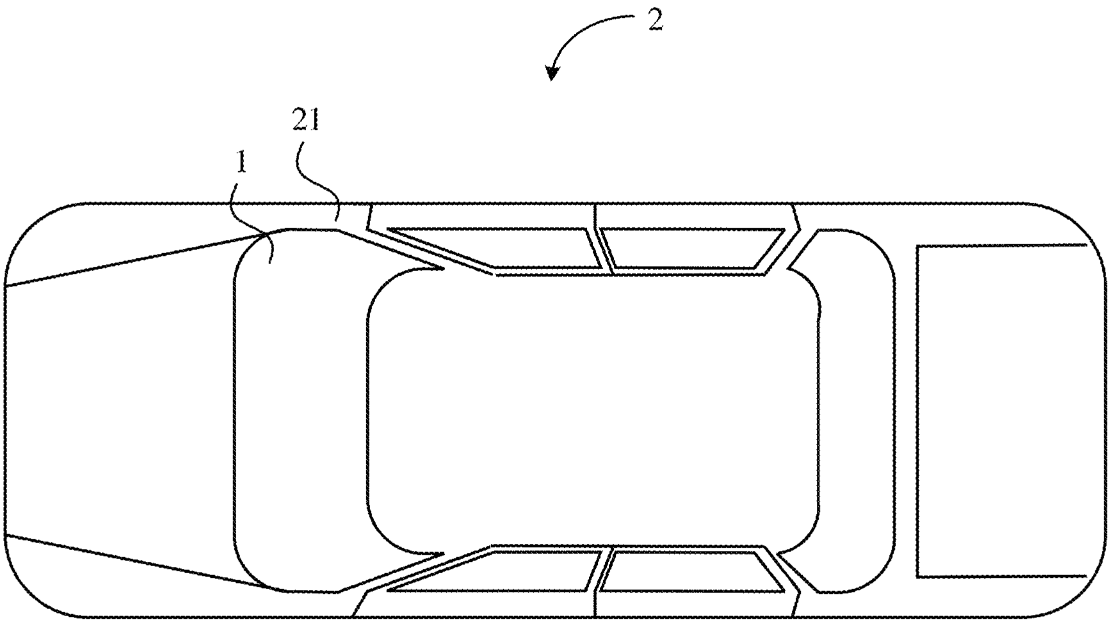
FIG. 6 is a schematic top view of a vehicle provided in an implementation of the present disclosure.

A vehicle 2 is further provided in the present disclosure. Reference can be made to FIG. 6 together, which is a schematic top view of a vehicle provided in an implementation of the present disclosure. The vehicle 2 includes the vehicle window assembly 1 as described above and a vehicle frame 21. The vehicle window glass 12 is mounted to the vehicle frame 21. The LiDAR 11 is mounted to the vehicle window glass 12 or the vehicle frame 21. The LiDAR 11 is located in the vehicle 2. Specifically, for the vehicle window assembly 1, reference can be made to the description above, which will not be repeated herein.

Although the principle and implementations of the present disclosure are described herein by using specific examples herein, descriptions of embodiments are merely intended to help understand the core idea of the present disclosure. Meanwhile, for those of ordinary skill in the art, changes may be made to the specific implementations and application range based on the idea of the present disclosure. In conclusion, the contents of this specification may not be construed as a limitation to the present disclosure.

What is claimed is:

1. A vehicle window assembly, wherein the vehicle window assembly comprises a LiDAR and vehicle window glass, the vehicle window glass comprises a first transparent plate, a thermoplastic interlayer, and a second transparent plate that are stacked, the LiDAR is disposed at one side of the second transparent plate away from the thermoplastic interlayer, the LiDAR is configured to emit laser light and receive laser light reflected by an object to-be-measured, the laser light emitted by the LiDAR comprises P-polarized light, the P-polarized light has a wavelength ranging from 800 nm to 1580 nm, the P-polarized light is incident onto the second transparent plate at an angle of incidence ranging from 55° to 70°, and the vehicle window glass has a transmittance greater than or equal to 90% for the incident P-polarized light; wherein the first transparent plate and/or the second transparent plate has a first refractive index for natural light having a wavelength of 905 nm, the first transparent plate and/or the second transparent plate has a second refractive index for natural light having a wavelength of 1550 nm, and the first refractive index is greater than the second refractive index; and the first refractive index ranges from 1.450 to 1.485, and the second refractive index ranges from 1.435 to 1.468.

2. The vehicle window assembly of claim 1, wherein the laser light emitted by the LiDAR is pure P-polarized light.

3. The vehicle window assembly of claim 1, wherein the laser light emitted by the LiDAR further comprises S-polarized light, and a proportion of the S-polarized light in the laser light emitted by the LiDAR is less than or equal to 20%.

4. The vehicle window assembly of claim 1, wherein the first transparent plate and/or the second transparent plate has a first transmittance for natural light having a wavelength of 905 nm, and the first transparent plate and/or the second transparent plate has a second transmittance for natural light having a wavelength of 1550 nm, and the first transmittance is less than the second transmittance.

5. The vehicle window assembly of claim 1, wherein the first transparent plate and/or the second transparent plate has an absorption coefficient of light ranging from 0.04 $cm^{-1}$ to 0.2 $cm^{-1}$.

6. The vehicle window assembly of claim 1, wherein the first transparent plate and/or the second transparent plate has an absorption coefficient of light ranging from 0.05 $cm^{-1}$ to 0.18 $cm^{-1}$.

7. The vehicle window assembly of claim 1, wherein the first transparent plate and/or the second transparent plate has an absorption coefficient of light ranging from 0.07 $cm^{-1}$ to 0.12 $cm^{-1}$.

8. The vehicle window assembly of claim 1, wherein the first transparent plate is provided with an anti-reflective coating on a surface of the first transparent plate away from the thermoplastic interlayer, and/or the second transparent plate is provided with an anti-reflective coating on a surface of the second transparent plate away from the thermoplastic interlayer; and the anti-reflective coating is configured to increase a transmittance of the vehicle window glass for the incident P-polarized light by at least 1.2%.

9. The vehicle window assembly of claim 1, wherein the second transparent plate defines a through hole in a region of the second transparent plate corresponding to the LiDAR, and/or the thermoplastic interlayer defines a through hole in a region of the thermoplastic interlayer corresponding to the LiDAR.

10. The vehicle window assembly of claim 9, wherein the first transparent plate is provided with an anti-reflective coating on a surface of the first transparent plate close to the thermoplastic interlayer, and the anti-reflective coating is configured to increase a transmittance of the vehicle window glass for the incident P-polarized light by at least 1.2%.

11. The vehicle window assembly of claim 8, wherein the anti-reflective coating has a thickness ranging from 200 nm to 1200 nm in a stacking direction.

12. The vehicle window assembly of claim 10, wherein the anti-reflective coating has a thickness ranging from 200 nm to 1200 nm in a stacking direction.

13. The vehicle window assembly of claim 1, wherein the first transparent plate is provided with an infrared reflective coating or an infrared absorbing coating on at least 70% of a surface of the first transparent plate close to the thermoplastic interlayer, or the second transparent plate is provided with an infrared reflective coating or an infrared absorbing coating on at least 70% of a surface of the second transparent plate close to the thermoplastic interlayer; and the first transparent plate is not provided with the infrared reflective coating or the infrared absorbing coating in a region corresponding to the LiDAR on the surface of the first transparent plate close to the thermoplastic interlayer, or the second transparent plate is not provided with the infrared reflective coating or the infrared absorbing coating in the region corresponding to the LiDAR on the surface of the second transparent plate close to the thermoplastic interlayer.

14. The vehicle window assembly of claim 1, wherein the vehicle window glass has a total solar energy transmittance less than or equal to 50%.

15. The vehicle window assembly of claim 1, wherein in an operation wavelength range of the LiDAR, the first transparent plate and/or the second transparent plate has a higher transmittance for P-polarized light than natural light.

16. The vehicle window assembly of claim 1, wherein the thermoplastic interlayer is sound insulation polyvinyl butyral (PVB).

17. The vehicle window assembly of claim 1, further comprising a thermal insulation layer, the thermal insulation layer further defines a through hole in a region of the thermal insulation layer corresponding to the LiDAR, and the thermal insulation layer is selected from a single silver coating, a double silver coating, a three silver coating, or a silver alloy coating.

18. A vehicle, wherein the vehicle comprises a vehicle window assembly and a vehicle frame, the vehicle window assembly comprises a LiDAR and vehicle window glass, the vehicle window glass comprises a first transparent plate, a thermoplastic interlayer, and a second transparent plate that are stacked, the LiDAR is disposed at one side of the second transparent plate away from the thermoplastic interlayer, the LiDAR is configured to emit laser light and receive laser light reflected by an object to-be-measured, the laser light emitted by the LiDAR comprises P-polarized light, the P-polarized light has a wavelength ranging from 800 nm to 1580 nm, the P-polarized light is incident onto the second transparent plate at an angle of incidence ranging from 55° to 70°, and the vehicle window glass has a transmittance greater than or equal to 90% for the incident P-polarized light; and the vehicle window glass is mounted to the vehicle frame, the LiDAR is mounted to the vehicle window glass or the vehicle frame, and the LiDAR is located in the vehicle; wherein the first transparent plate and/or the second transparent plate has a first refractive index for natural light having a wavelength of 905 nm, the first transparent plate and/or the second transparent plate has a second refractive index for natural light having a wavelength of 1550 nm, and the first refractive index is greater than the second refractive index; and the first refractive index ranges from 1.450 to 1.485, and the second refractive index ranges from 1.435 to 1.468.

* * * * *